E. F. & W. L. OSBORNE.
M. C. OSBORNE, ADMINISTRATRIX OF E. F. OSBORNE, DEC'D.
JOINT FOR CONNECTING FITTINGS.
APPLICATION FILED SEPT. 30, 1910. RENEWED JULY 15, 1912.
1,035,810.
Patented Aug. 13, 1912.
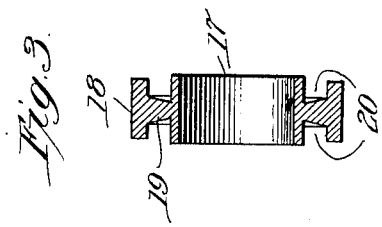
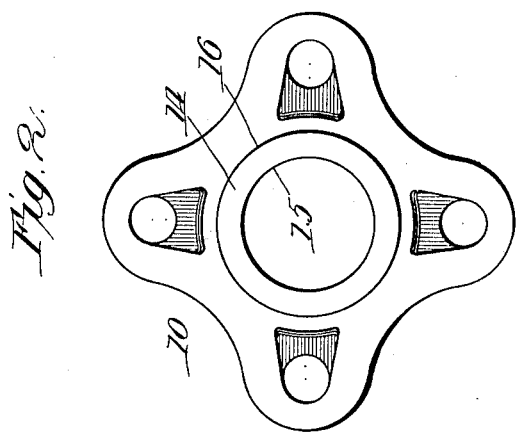
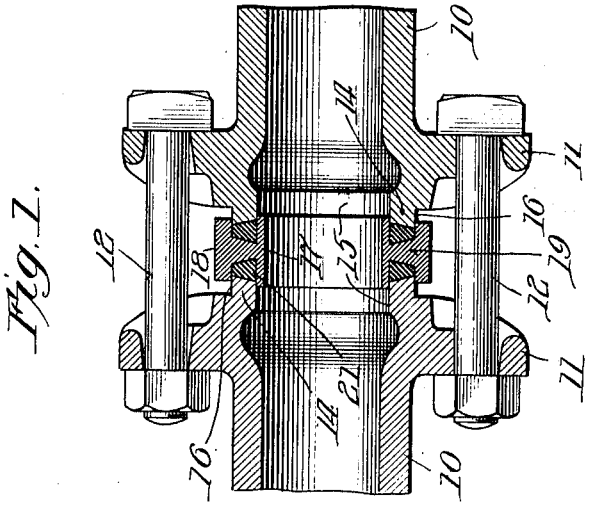

UNITED STATES PATENT OFFICE.

EUGENE F. OSBORNE, DECEASED, BY MARY C. OSBORNE, ADMINISTRATRIX, AND WILLIAM L. OSBORNE, OF CHICAGO, ILLINOIS, ASSIGNORS TO OSBORNE STEAM ENGINEERING COMPANY, OF CHICAGO, ILLINOIS, A CORPORATION OF ILLINOIS.

JOINT FOR CONNECTING FITTINGS.

1,035,810. Specification of Letters Patent. Patented Aug. 13, 1912.

Original application filed January 3, 1910, Serial No. 535,980. Divided and this application filed September 30, 1910, Serial No. 584,625. Renewed July 15, 1912. Serial No. 709,576.

*To all whom it may concern:*

Be it known that we, MARY C. OSBORNE and WILLIAM L. OSBORNE, citizens of the United States, and residents of Chicago, county of Cook, and State of Illinois, represent that heretofore EUGENE F. OSBORNE, now deceased, referred to in the accompanying petition, and the within-named WILLIAM L. OSBORNE did jointly invent certain new and useful Improvements in Joints for Connecting Fittings, (said MARY C. OSBORNE having been duly appointed administratrix to the estate of said EUGENE F. OSBORNE, deceased, as by reference to a certified copy of letters of administration annexed to the aforesaid petition will more fully appear;) and we, the said MARY C. OSBORNE and WILLIAM L. OSBORNE, do hereby declare the following to be a full, clear, and exact description of said invention, reference being had to the accompanying drawings, and to the reference characters marked thereon, which form part of the specification.

This invention relates to improvements in high pressure joints for connecting fittings in a piping line, such for instance as valve fittings, T or elbow fittings and the like, and the invention consists in the matters hereinafter set forth and more particularly pointed out in the appended claim.

The object of the invention is to provide a simple, compact, economical and efficient joint, adapted more particularly for use in piping lines for conveying fluids under high pressure, and a joint which may be easily assembled and taken apart.

In the drawings, Figure 1 is an axial section of the adjacent ends of two fittings connected by a joint embodying the invention. Fig. 2 is an end view of one of the fittings. Fig. 3 is a section of the union ring of the joint.

As shown in the drawings, 10, 10 designate the adjacent ends of two tubular fittings that are adapted to be connected in alinement by the joint embodying the present invention. Said fittings are provided at their ends with integral flanges 11 through alined openings in which extend clamping bolts 12 by which the joint making members are pressed together. Each fitting is provided at its inner end with an annular lip or extension 14 surrounding the bore thereof. The said lip is provided with an interior cylindrical opening 15 and an exterior cylindric surface 16. The fittings are connected by a union ring which comprises inner and outer cylindric, concentric members 17 and 18, respectively, and a central web 19. The inner member 17 fits closely at its ends in the cylindric opening 15 and an exterior cylinthe outer, concentrically arranged member 18 fits over the exteriorly cylindric portions 16 of the annular lips 14. The said web portion 19 is arranged midway between the ends of the members 17 and 18 of the coupling ring so as to provide at the ends of the ring spaces 20 to receive packing rings 21, 21 and the inner ends of the lips or extensions 14 of the fittings. Said web portion as herein shown is made integral with the cylindric members 17 and 18. The lips 14 of the fittings constitute the male members of the joint, and the spaces 20 between the inner and outer members 17 and 18 of the union ring constitute the female members of the joint which receives the said lips or male members 14 and the packing rings 21. The packing rings 21, 21 are compressed between the ends of said lips 14 and the annular web 18 of the junction ring, said web constituting a common packing ring abutment for the two packing rings of the joint. The ends of said annular lips 14 are inclined to the diametric plane of the union ring and the sides of the packing ring abutment or web 19 of said ring are oppositely inclined to give to each packing ring recess when the parts are assembled, a generally triangular cross section. The packing rings are of general triangular cross section to fill said recesses so that when the flanged fittings are forced together the tapered sides of the packing rings are acted upon by the opposingly inclined surfaces of the lips 14 and the abutment 19 in a manner to force the packing rings closely on the inner member 17 of the coupling ring. The said packing rings are surrounded on all sides by metal walls, which prevent the packing rings from flowing under pressure, and the cross section of the packing rings and the recess is such as to produce a particularly tight joint, well adapted to withstand high pressures.

This application is a division of the prior application of Eugene F. Osborne and William L. Osborne, filed January 3, 1910, Serial No. 535,980.

The joint described is compact and requires but little space, is easy to manufacture and install and is very efficient to produce a fluid tight joint between the two fittings connected thereby.

The details of the construction are capable of slight variation within the scope of the invention, and the invention is not limited to the exact details shown, except as hereinafter made the subject of a specific claim.

What is claimed as new is as follows:—

The combination with two tubular fittings arranged end to end and provided at their inner ends with integral flanges and clamping means engaging the flanges for clamping the fittings together, and provided also at their adjacent ends with annular lips constituting the male members of a joint, of a union member between said fittings comprising an outer relatively thick ring member arranged to fit outside said lips and an inner relatively thin ring member to fit within said annular lips and a radial abutment, and packing rings between said inner and outer members, said lips being adapted to enter the annular spaces between said members and to compress the packing rings between the same and said abutment.

In testimony whereof, the foregoing is claimed as the invention of said EUGENE F. OSBORNE, deceased, and WILLIAM L. OSBORNE, we have affixed our signatures in the presence of two witnesses this 19th day of May, 1910.

MARY C. OSBORNE,
*Administratrix of the estate of Eugene F. Osborne, deceased.*

WILLIAM L. OSBORNE.

Witnesses:
 ISABELL BIDDLE,
 WILLIAM L. HALL.